PRODUCTION OF MAGNETIC SOUND TAPE

Original Filed Dec. 29, 1951

INVENTORS
WILLIAM C. SPEED
JAMES J. DWYER
BY
Pennie, Edmonds, Morton, Barrows and Taylor
ATTORNEYS April 24, 1956 W. C. SPEED ET AL 2,743,189

PRODUCTION OF MAGNETIC SOUND TAPE

Original Filed Dec. 29, 1951 6 Sheets-Sheet 2

INVENTORS
WILLIAM C. SPEED
JAMES J. DWYER

BY Pennie, Edmonds, Morton, Barrows and Taylor

ATTORNEYS

PRODUCTION OF MAGNETIC SOUND TAPE

Original Filed Dec. 29, 1951 6 Sheets-Sheet 3

INVENTORS
WILLIAM C. SPEED
JAMES J. DWYER
BY
Pennie, Edmonds, Morton, Barrows and Taylor
ATTORNEYS

PRODUCTION OF MAGNETIC SOUND TAPE

Original Filed Dec. 29, 1951

INVENTORS
WILLIAM C. SPEED
JAMES J. DWYER
BY
Pennie, Edmonds, Morton, Barrows and Taylor
ATTORNEYS

PRODUCTION OF MAGNETIC SOUND TAPE

Original Filed Dec. 29, 1951 6 Sheets-Sheet 5

INVENTORS
WILLIAM C. SPEED
JAMES J. DWYER
BY
Pennie, Edmonds, Morton, Barrows and Taylor
ATTORNEYS

PRODUCTION OF MAGNETIC SOUND TAPE

INVENTORS
WILLIAM C. SPEED
JAMES J. DWYER
BY Pennie, Edmonds, Morton, Barrows and Taylor
ATTORNEYS United States Patent Office 2,743,189
Patented Apr. 24, 1956

2,743,189

PRODUCTION OF MAGNETIC SOUND TAPE

William C. Speed, Riverside, and James J. Dwyer, Stamford, Conn., assignors to Audio Devices, Inc., New York, N. Y., a corporation of New York Application December 29, 1951, Serial No. 264,182, which is a division of application Serial No. 264,181, December 29, 1951. Divided and this application December 29, 1951, Serial No. 264,185

3 Claims. (Cl. 117—7)

This invention relates to the production of magnetic sound recording tape and has for its object certain improvements in the method of coating tape base with magnetic material.

This application is a division of our co-pending applications Serial Nos. 264,181 and 264,182 filed simultaneously herewith, wherein we have disclosed a number of improvements in method and apparatus for producing magnetic sound recording tape, including the coating of tape base with finely divided magnetic material, usually a dispersion of specially prepared magnetic oxide of iron, evenly distributed in a suitable liquid vehicle.

Tape base of the moving picture film type (8, 16, 35 mm.), containing one or two rows of sprocket teeth holes, present special problems of coating with magnetic material because it is preferred, for example, not to have such material immediately around the holes because of its abrasive action on sprockets and tracks used in sound recording and sound-reproducing machines, and the desirability of having one or more accurately placed longitudinal bands or stripes of the coating material thereon. The coatings have tended to be irregular and defective.

In the case particularly of tape base of the moving picture film type although applicable also to other types of tape base, the use of the present improvements greatly facilitates the placement thereon of one or more longitudinal bands or stripes of the magnetic material, precisely where desired; and in a way not to impair the physical character of the tape base or the coating.

The features of the invention will be better understood by referring to the accompanying drawings, taken in conjunction with the following description, in which Fig. 1 is a plan view of a piece of tape base, specifically of the moving picture 35 mm. film type, coated with finely divided magnetic material;

Figure 2:
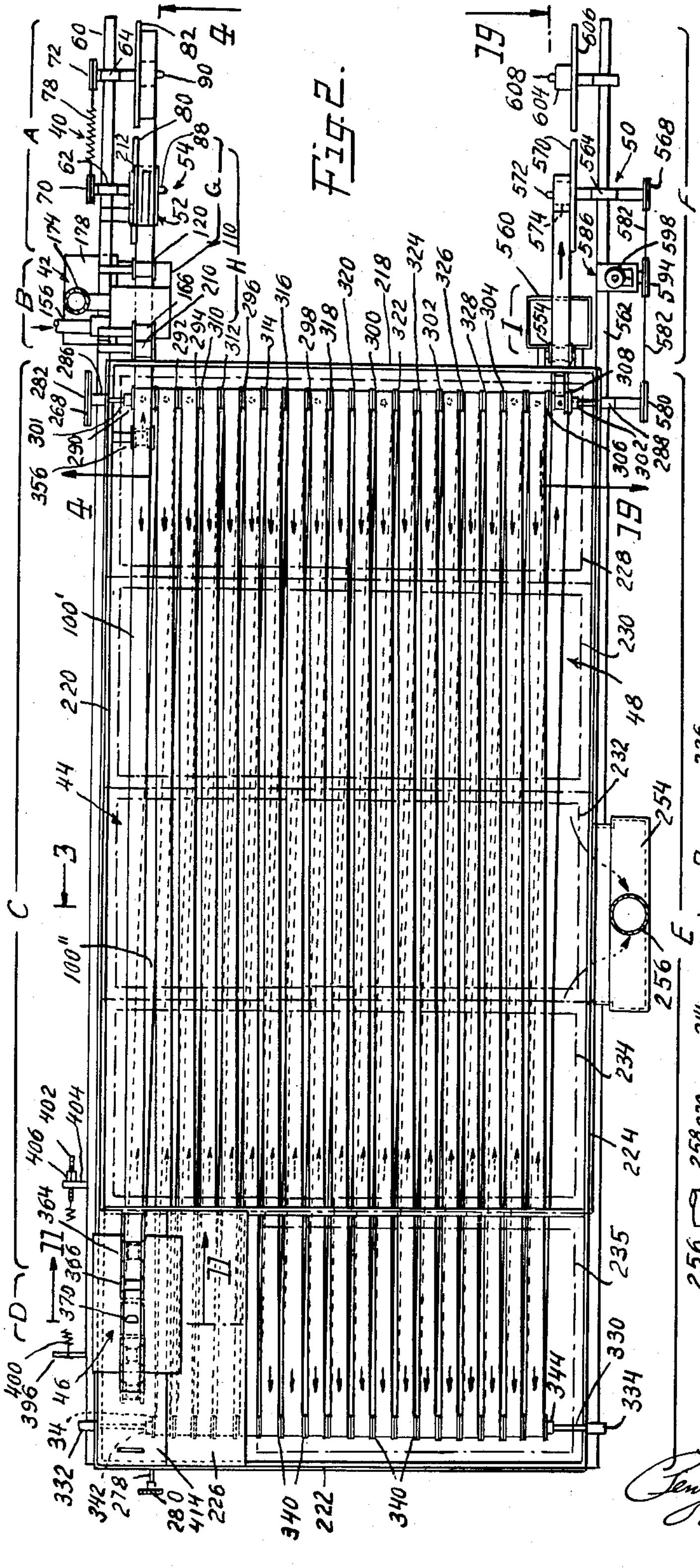
Fig. 2 is a plan view of an apparatus illustrative of a practice of the invention, showing a tape base unwinding device, a cleaning device, a preliminary drying machine, a coating machine, a final drying machine, a winding device, and a splicing device.
Figure 1:
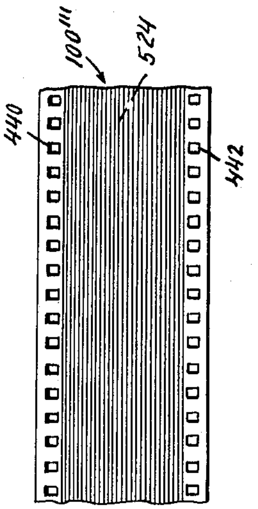
Figures 11, 12, 13, 14, 16, 17, 18:
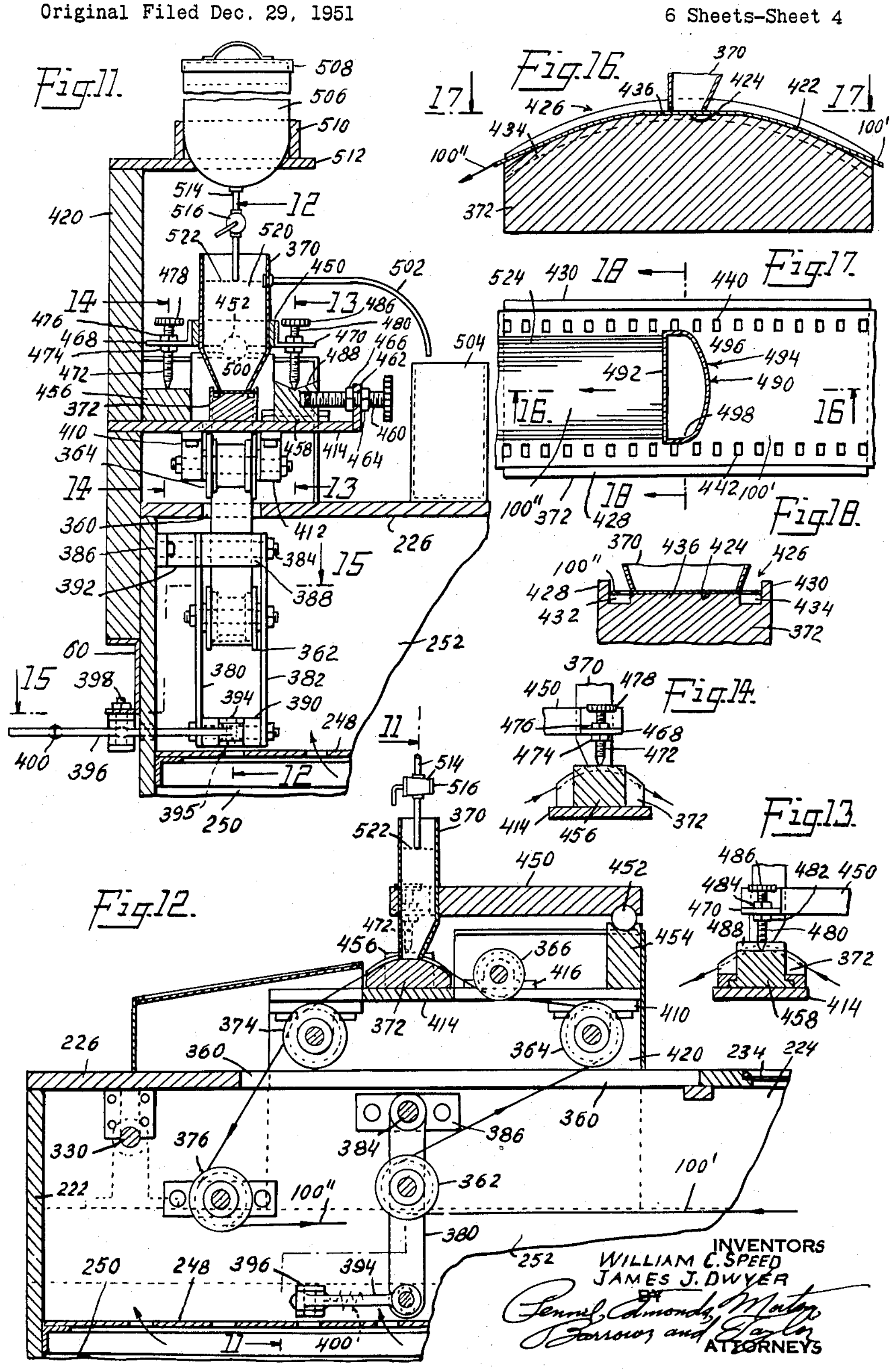
Fig. 11 is a section on line 11—11 of Fig. 2, showing a sectional end view of the coating machine.
Fig. 12 is a section on the line 12—12 of Fig. 11, showing a sectional side view of the coating machine.
Figures 15, 19, 20, 21, 22, 23:
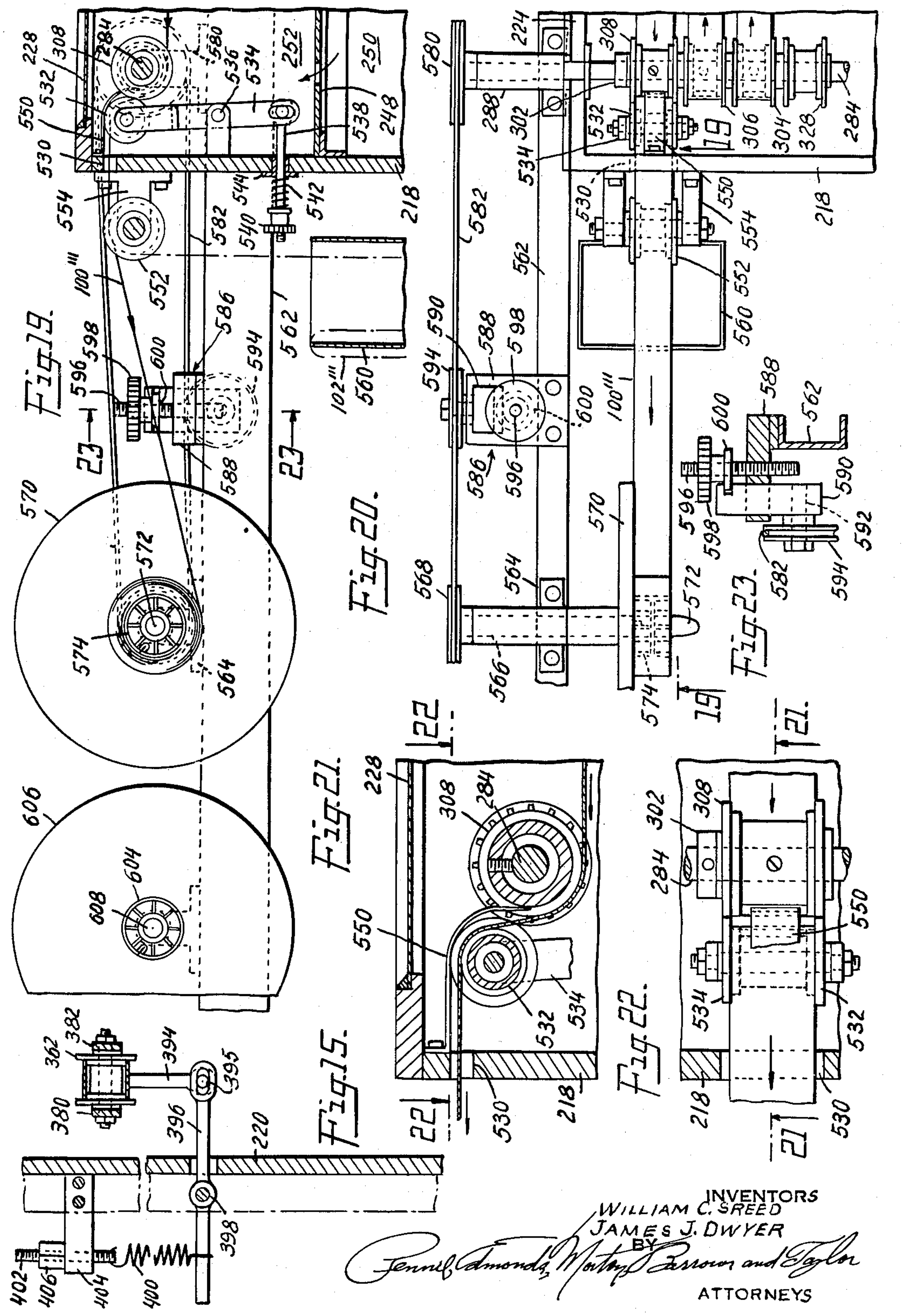

Figs. 13 and 14 are sectional views on the lines 13—13 and 14—14, respectively, of Fig. 11, showing adjusting means for the feed hopper of the coating machine;

Fig. 15 is a section on the line 15—15 of Fig. 11, showing tension means (see also Figs. 11 and 12) for the coated tape base, spliced and unspliced, as it moves through and away from the coating device;

Fig. 16 is a longitudinal sectional sideview on the line 16—16 of Fig. 17; Fig. 17 is a longitudinal top view on the line 17—17 of Fig. 16, and Fig. 18 a cross-sectional view on the line 18—18 of Fig. 17, showing the tape base as it advances under the feed hopper over a bottom support;

Fig. 19 is an enlarged section on the lines 19—19 of Figs. 2 and 20, showing a side interior view of the tape base discharge portion of the drying machine and the coated tape base winding device;

Fig. 20 is a partial plan view of Fig. 19, with a top window removed from the drying machine to show the interior thereof at the discharge end portion, as well as to show the top of the winding device;

Fig. 21 is a section on the line 21—21 of Fig. 22; and

Figures 4, 8, 9:
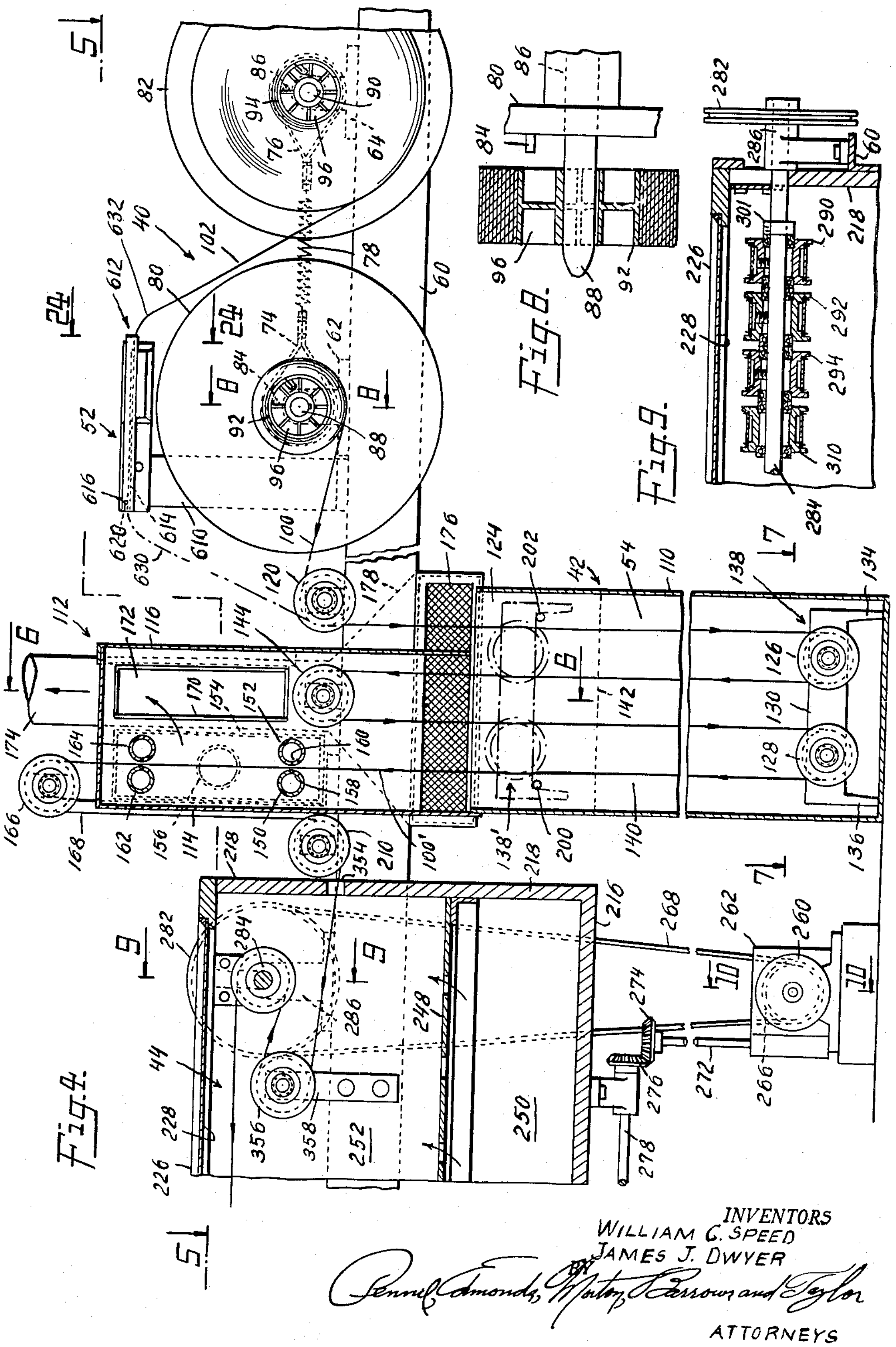
Fig. 4 is an enlarged section on the line 4—4 of Fig. 2, showing a side sectional view of the unwinding and cleaning devices.
Fig. 8 is a section on the line 8—8 of Fig. 4, showing a driving pin to fit in one of a plurality of circumferentially spaced pockets in the hub of a half-reel of the unwinding device.
Fig. 9 is a section on the line 9—9 of Fig. 4, showing a plurality of sprockets mounted on a drive shaft, for advancing the tape base in its path of travel.
Figures 24, 25, 26, 27, 28, 29, 30, 31:
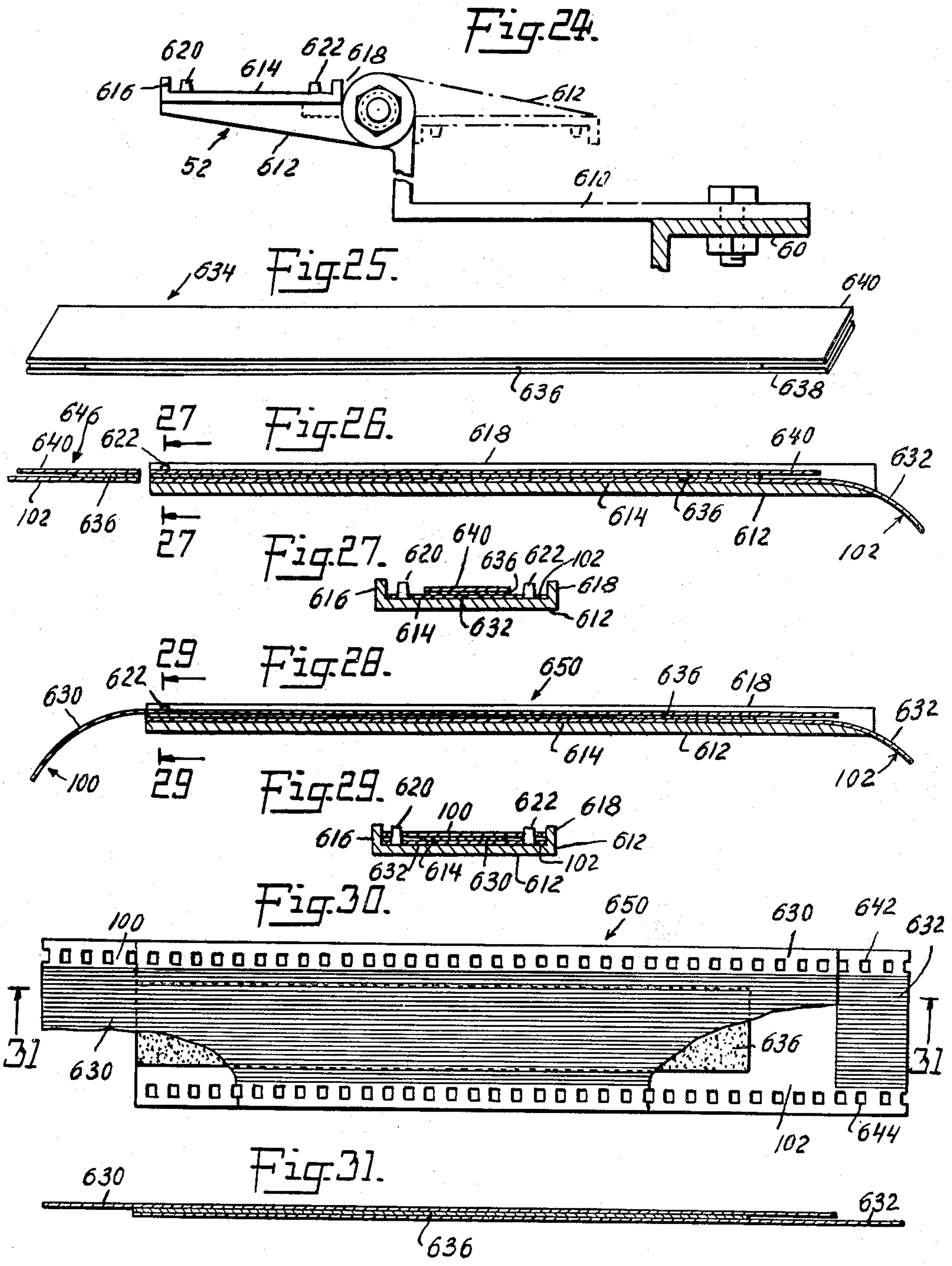

Fig. 22 is a section on the line 22—22 of Fig. 21, showing enlarged views of tension driving and guide means for the coated tape base at the discharge end (Figs. 19, 20) of the drying machine;

Fig. 23 is a section on the line 23—23 of Fig. 19, showing brake adjustment means for the drive belt of the winding device;

Fig. 24 is a section on the line 24—24 of Fig. 4, showing a support for the tape base splicing device;

Figs. 25–29 illustrate step taken to splice the rearward end of an unwound roll of tape base to the forward end of a wound roll of tape base about to be processed;

Fig. 25 is a perspective view of a flat adhesive splicing band, with temporary protective covers on both sides;

Fig. 26 is a longitudinal sectional view showing the forward end of a wound roll of tape base on the splicer and with the spicing band, lower cover removed, placed thereon;

Fig. 27 is a section on the line 27—27 of Fig. 26, showing the assembly mounted on the splicing device;

Fig. 28 is a longitudinal sectional view showing the upper cover of the splicing band removed; and the rearward end of an unwound roll of tape base on the assembly;

Fig. 29 is a section on the line 29—29 of Fig. 28, showing the latter assembly mounted in the splicing device;

Fig. 30 is a plan view of the cut-off spliced tape base after it has served its purpose to thread the second roll through the cleaning device, the over-all drying machine and the coating machine, corners being cut away to show the interior portions of the spliced area; and Fig. 31 is a section on the line 31—31 of Fig. 30, showing a side view of the same splice.

Reference may be made first to Fig. 2 for a general over-all layout of the apparatus. It is divided into the following: (1) a tape base unwinding zone A; (2) a cleaning zone B; (3) a preliminary drying zone C; (4) a coating zone D; (5) a final drying zone E; (6) a winding zone F; (7) a splicing zone G; (8) a slack-producing zone H; and (9) a spliced-portion cut-out zone I.

In terms of apparatus, the zones may be regarded in turn as being divided into a tape base unwinding device 40, a cleaning device 42, a preliminary drying machine 44, a coating machine 46, a final drying machine 48, a winding device 50, a splicing device 52, and a slack-producing device 54.

They shall be taken up in that order. It will be clear that the preliminary and the final drying machines may be regarded as one and the same machine, although they could, of course, be separate from one another. This is true also of the cleaning and slack-producing devices. The spliced-portion cut-out zone need not be provided with special apparatus, a pair of shears only being advisable.

*Unwinding device*

Going first, therefore, to tape base unwinding device 40, reference is made to Figs. 2, 4, 5 and 8. It includes a rearwardly extending back side arm 60 to the top of which a pair of spaced journals 62 and 64 are secured. The journals are fitted with shafts 66 and 68, fitted at their rear ends with brake-discs 70 and 72, respectively. The discs are recessed to accommodate flexible brake bands 74 and 76, the ends of which are secured to a tension spring 78, the tension being regulated to provide an optimum band pressure on the discs.

The forward ends of the shafts are secured to half-reels 80 and 82 adapted to hold rolls of tape base, the forward flat faces of which are provided with pocket-pins 84 and 86 and tapered ends 88 and 90. The tapered shaft ends fit into complementary shaft holes of hubs 92 and 94. The hubs are provided with a plurality of circumferentially spaced pocket-holes 96 adapted to receive the pocket-pins of the half-reels. This arrangement of pins and pocket-holes permits easy placement of tape-base loaded hubs on the tapered shaft ends for unwinding and easy removal of the hubs when unloaded. As shown in Fig. 4, hub 92 is almost unloaded or empty, tape base 100 still being fed therefrom to cleaning device 42. Hub 94 is loaded with a roll of tape base 102 awaiting its turn to be fed to the cleaning device when hub 92 is unloaded. The splicing of the two pieces of tape base will be described below.

*Cleaning and slack-producing devices*

Cleaning device 42 and slack-producing device 54 are shown in Figs. 2, 4, 5, 6 and 7. They include (Fig. 4) a tank 110 with an upper housing 112 having (Fig. 5) removable L-shaped side walls 114 and 116 for easy access to the tank. On leaving hub 92 (or 94), tape base 100 (Fig. 4) passes over the top and downwardly along a roller 120 mounted on a lateral shaft supported by a bracket 122 (Fig. 5) attached to rearwardly extending arm 60. A number of similar rollers are used throughout the apparatus. They have side flanges, like sprockets, but no teeth and act primarily as guides. This assembly is located directly above an inlet 124 in an offset portion of the tank.

The bottom interior (Fig. 4) of the tank is fitted with a pair of spaced bottom rollers 126 and 128 rotatably mounted (Fig. 7) between a pair of spaced side supports 130 and 132 with end legs 134 and 136 (Fig. 4) normally resting by gravity on the interior bottom of the tank. This roller assembly 138 (Fig. 4) is movable as a unit up and down the tank within the cleaning liquid. The tape base passes downwardly through a body of cleaning liquid 140 maintained at a normal level 142, around first bottom roller 126, rises to and moves around a housing roller 144 mounted on a lateral shaft supported by a bracket 146 (Fig. 5) extending through the rear of the housing, attached to arm 60; similar to roller 120 in the same plane exteriorly of the housing.

The tape base then descends (Fig. 4) to and around second bottom roller 128, described above; thence upwardly between a lower pair of spaced air-squeegees 150 and 152 in the form of lateral pipes, closed at their forward ends, connecting at their rear ends with an air distributing chamber 154 (Fig. 5) attached to the rear wall of the housing. The chamber connects, in turn, with a compressed air conduit 156. The air-squeegees are provided with small transverse slits or holes 158 and 160 slightly below a plane passing horizontally through their centers, so that currents of air are directed downwardly against wet cleaned tape base 100′ as it rises between the squeegees, thus forcing and directing liquid on both sides of the tape base downwardly toward and into the main body of cleaning liquid. The tape base, thus partially dried, rises to and passes between an upper pair of similar air-squeegees 162 and 164, similarly secured to the air distributing chamber, and similarly provided with small transverse slits or holes. The rising tape base is thus subjected to a double air blast on both sides to assure the removal of excess cleaning liquid.

Any suitable cleaning liquid may be employed, such as water, preferably with a detergent added thereto. The cleaning solution or compound should be one that does not attack, and therefore damage, the particular tape base being used. Among the cleaning compounds are carbon tetra-chloride, tri-chlor-ethylene, toluol, de-greasing agents, etc.

The cleaned and partially air-dried tape base rises (Fig. 4) through the top of the housing to and around a roller 166 mounted above the far left of the housing in a bracket 168 secured to arm 60.

During its transit through the cleaning device, tape base 100 is given a thorough cleaning. Augmented cleaning action is obtained as the tape base moves rapidly through and hence in frictionable engagement with the body of cleaning liquid, which in turn is kept in a continuous state of agitation that in itself exerts a washing effect. In addition, each portion of the moving tape base is in wiping engagement successively with the three rollers. This is true particularly of the side of the tape base to be coated. It receives at least two such wipings against the bottom rollers. More rollers and more air-squeegees may be employed, if desired. The moving tape base may be caused likewise to slide against fixed wipers, not shown, in the body of cleaning liquid. The air under pressure escaping from the two pairs of air-squeegees of course also exerts a cleaning action on both sides of the tape base.

Figures 5, 6, 7, 10:
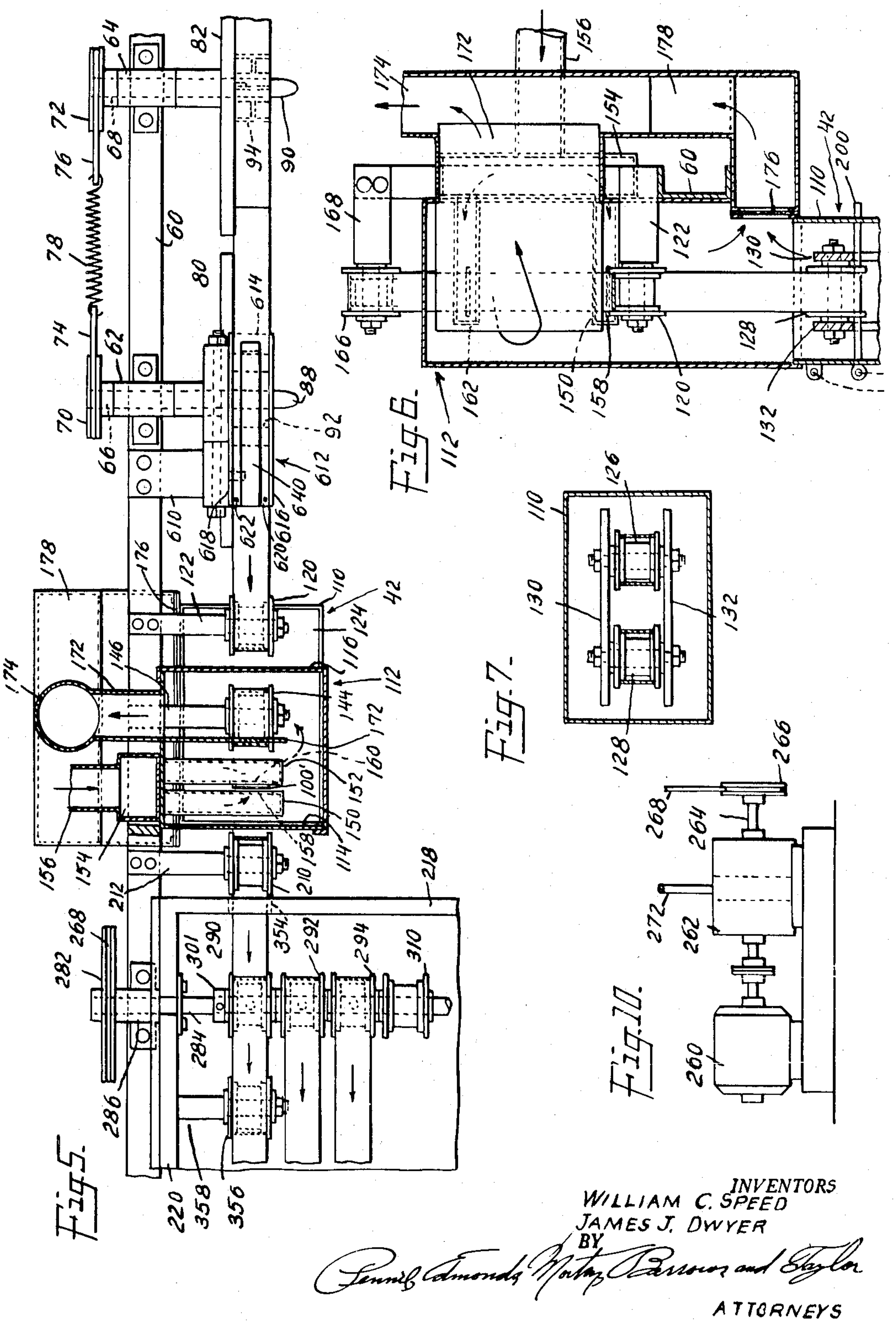
Fig. 5 is an enlarged section on the line 5—5 of Fig. 4, showing a top view of the unwinding and cleaning devices.
Fig. 6 is a section on the line 6—6 of Fig. 4, showing a partial end view of the cleaning device.
Fig. 7 is a section on the line 7—7 of Fig. 4, showing a top view of the bottom portion of the cleaning device.
Fig. 10 is a section on the line 10—10 of Fig. 4, showing a drive motor and a speed regulator associated with the drive shaft.

As more particularly shown in Figs. 4 and 5, ample provision is made for the escape of used air and cleaning liquid vapors. Thus, a baffle plate 170 attached to the rear wall of the housing extends forwardly adjacent to and slightly beyond the air squeegees, thus forcing the used air to pass around the forward end, under the bottom and over the top, of the baffle plate. Such air then finds its way into lateral conduit 172 (Fig. 5) and upright vent-pipe 174, by forced draft, to the outside atmosphere.

This forced draft is utilized also to carry vapors from the cleaning liquid, which could, in some cases, be harmful or obnoxious to workmen in the same room, to the outside atmosphere. To this end a filter-passageway 176 extends across the rear of the housing, well above the cleaning liquid level, connecting with a hood 178 (Fig. 5) terminating at its top with the vent-pipe.

As noted above, roller assembly 138 is movable as a unit up and down the tank within and out of the cleaning liquid. This is for a number of highly useful purposes. One is to raise the rollers and hence the loops of tape base as its tail or rear end portion is spliced to the forward end portion of a succeeding roll of tape base, as will be described in more detail below. Another is to raise the rollers and hence the loops of tape base above the liquid level when operations are suspended, say for the night, or any other reason, or when it is desired to clean the tank and to replace the old with new cleaning liquid. For the latter purposes the end walls of the tank (Figs. 4 and 6) are provided with complementary holes well above the normal liquid level to receive removable lateral rods 200 and 202, spaced to span the free space between end legs 134 and 136 and thus to permit spaced side supports 130 and 132 of the roller assembly to rest on the rods. As shown in dotted outline 138' in Fig. 4, the roller assembly is then well above level 142 of the cleaning liquid.

*Preliminary and final drying machines*

The cleaned and partially air-dried tape base is then passed (Fig. 4) downwardly, around roller 210 on bracket 212, secured to the laterally extending arm support as before.

Thence the cleaned tape base passes (Fig. 4) into and through the preliminary drying machine 44. Although the tape base passes through that machine and also coating machine 46 before final drying machine 48, since the two drying machines form a more or less unitary assembly, it may be helpful to describe them at this point.

Figure 3:
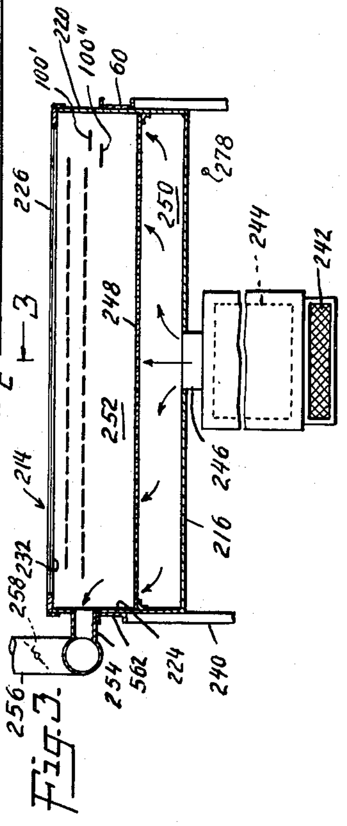
Fig. 3 is a section of the line 3—3 of Fig. 2, showing a sectional view of the over-all drying machine.

The preliminary and final drying machines together form a closed elongated box-like structure 214 (Fig. 2) with a bottom (Fig. 3) 216, a right end wall 218 (Fig. 2), a back side wall 220, a left end wall 222, a front side wall 224, and a top 226 (Fig. 3). The top is covered with a plurality of removable windows 228, 230, 232, 234 and 235, for visibility and access. The box-like structure as a whole rests on a frame support 240 (Fig. 3) not wholly shown. Rearwardly extending back side arm 60 is integrally secured to back side wall 220 (Fig. 2).

Referring for the moment to Figs. 3 and 4, it will be noted that an air line with a filter 242, a heater 244, and an inlet 246 connect the central bottom portion of the box-like structure, which is divided horizontally by a perforated partition 248 into a lower over-all heated air-distributing chamber 250 and an upper over-all drying chamber 252. A breaching 254 connects the upper front side of the drying chamber with a stack 256, having a damper 258, for the controlled venting of spent drying air to the outside atmosphere.

Also associated with the box-like structure is suitable driving mechanism to pass the tape base through the apparatus as a whole. This mechanism includes (Figs. 4 and 10) a motor 260, a speed-reducer or regulator 262, with a cross drive shaft 264, a lower drive pulley 266 on the end of the drive shaft of the speed reducer, and a drive belt 268 for the right end of the drying machines.

The speed regulator 262 is provided to control the speed of the motor. It includes an upright rod 272 which connects at its lower end with the speed reducer and at its upper end with a bevel gear 274 in mesh with another bevel gear 276, the latter being connected to one end of a laterally extending rod 278 terminating (Fig. 2) in a hand wheel 280 slightly beyond the left end of the box-like structure. The wheel may be turned to reduce or increase the speed of the motor, as desired.

Drive belt 268 (Figs. 2, 4 and 5) at its upper portion fits around an upper pulley 282 secured to the far end of a right cross drive shaft 284 extending horizontally through the upper right hand end portion of the drying chamber. The shaft is supported in journals 286 and 288 (Fig. 2) attached to the frame support. A plurality of sprockets and rollers are mounted on the shaft, the sprockets being integrally and the rollers loosely mounted thereon. Unlike the rollers, the sprockets are provided circumferentially with two rows of sprocket teeth adapted to fit into the sprocket holes of the tape base. In the instant construction, the sprockets and the rollers number ten each, a total of twenty. The former are three far end sprockets 290, 292 and 294 (Fig. 9); four single intermediate sprockets (Fig. 2) 296, 298, 300 and 302; and (Fig. 20) three near end sprockets 304, 306, and 308. The latter are divided into five pairs, 310—312, 314—316, 318—320, 322—324 and 326—328. The sprockets and rollers are kept in position on the shaft by end collars 301 and 302.

The upper left portion of the drying chamber is provided with a left cross shaft 330, suitably supported in journals 332 and 334. It is fitted with a plurality of rollers 340, a total of eighteen in the instant construction. They are loosely mounted on the shaft, being kept in proper alignment to avoid lateral movement by collars 342 and 344. No sprockets are used on this shaft because found to be unnecessary. The shaft is not power-driven. As will be explained below, the eighteen rollers to the left and the near nineteen sprockets and rollers to the right complement each other in operating to pass the coated tape base generally back and forth in what amounts to a helical path of travel.

As already noted, on leaving the cleaning device (Fig. 4), the cleaned partially air-dried tape base passes downwardly to and around a roller 210. The tape base passes through a slot 354 in right end wall 218 into upper over-all drying-chamber 252 and moves around a roller 356 mounted on a bracket 358 attached to back side wall 220. The latter roller is located a short distance forward of and at a slightly lower level than right cross drive shaft 284. This arrangement (Figs. 4, 5 and 9) helps to place the tape base under suitable tension as it passes around first far end drive sprocket 290 and is advanced (Fig. 2) longitudinally across the drying chamber to coating machine 46. While thus in transit the tape base is in contact with heated air and is dried in readiness for receiving a coating of magnetic material.

If desired, the cleaned and dried tape base may be given a preliminary coating of suitable adhesive material, for example, in the manner described in our co-pending application, Serial No. 201,794, filed December 21, 1950, to facilitate adherence of the magnetic coating.

*Coating machine*

The coating machine is illustrated in some detail in Figs. 11–18. As shown in Figs. 2, 11 and 12, it is located in and above an opening 360 in the far left corner portion of top 226 of the drying chamber. The coating machine includes a series of five rollers (Fig. 12) to direct the tape base to, through, and away from the coating step per se. The first three 362, 364 and 366, are in advance of a feed hopper 370 and a tape base bottom support 372, and the remaining two rollers 374 and 376 follow thereafter. The first advance roller 362 is mounted below the bottom support, between and intermediate (Fig. 11) the ends of a pair of spaced depending arms 380 and 382 pivotally suspended at their upper ends to a laterally extending rod 384 secured at its rear end to a bracket 386 attached to the rear side wall of the drying chamber. Sleeves 388 and 390 separate the arms from each other and sleeve 392 separates the arms from the side wall. The lower ends of the depending arms are connected pivotally (Fig. 12) to a forward-arm 394 the end of which is pivotally connected by means of a pin and slot connection 395 to a lateral-arm 396 extending through the back side wall, being supported intermediate its ends by a pivot 398. A tension spring 400 (Fig. 2) is secured at one end to the outer end portion of the lateral arm and at the other end to a threaded rod 402 extending through a hole in an anchor 404 secured to the back side wall. A lock nut 406 fits on the free end of the threaded rod. The assembly just described is used to fix the position of the first advance roller 362 in the path of travel of the tape base. Movement of the threaded rod toward the right end of the drying chamber causes the roller to move toward the left end of the chamber, and hence to place the advancing tape base under greater tension. The tension may be diminished by moving the threaded rod toward the left end of the drying chamber, when the roller is moved to the right. Spring 400 also keeps the roller under yieldable tension so that it is free to yield a small amount forwardly or rearwardly, as required, while the tape base moves around the roller to the second advance roller.

Second advance roller 364 (Figs. 11 and 12) in the series is located in a fixed position above and to the right of the first advance roller, but in advance of and below tape base bottom support 372 in the path of travel of the tape base, being supported in spaced journals 410 and 412 attached to the under side of a platform 414 disposed externally of and above the drying chamber. The under side of the tape base engages and moves around the right side portion of the roller toward third advance roller 366. The third advance roller (Fig. 12) is located in fixed position slightly in advance of the bottom support, being supported by spaced journals 416 secured to the top of platform 414. This roller, unlike the preceding roller, engages the upper side of the tape base and depresses it onto the bottom support. The path of travel of the tape base between the two rollers is arched or convex, thus also helping to keep the tape base under tension as it is coated.

The tape base thereupon moves directly below feed hopper 370, and slides across the arched top surface of bottom support 372 to and partly around fourth roller 374 located below and slightly to the left of the bottom support, the position of the roller being fixed so that the tape base remains in contact with the bottom support an appreciable distance beyond the feed hopper.

Fifth roller 376 (Fig. 12) is fixedly located below and slightly to the left of the preceding roller, and also slightly below the first roller in the series, to direct the coated tape base toward the right end of the drying chamber. As shown in Fig. 3, the uncoated but cleaned tape base 100′ going to the coating machine overlaps slightly the coated tape base 100″ as it advances toward the right end of the drying chamber. Before tracing further the progress of the tape base, the remainder of the coating machine will be described.

Feed hopper 370 and bottom support 372 (Figs. 11 and 12) are carried by platform 414 which is secured to a vertical support 420 attached to back side wall 220. The bottom support is integrally secured to the platform. As shown to better advantage in Fig. 16, its top surface is generally convex or arched in longitudinal contour 422, with a flattened intermediate portion 424. As shown in Fig. 18, the top of the bottom support is provided with an over-all channel 426, its side boundaries being defined by flanges 428 and 430. The width of the over-all channel is adapted to accommodate the tape base, not snugly and not too loosely. The tape base slides easily through the channel. It does not move laterally from side to side; nor does it become bound between the flanges.

The top of the bottom support is also provided with a pair of side drainage troughs 432 and 434 adjacent the flanges and intermediate raised bearing portion 436 of the bottom support. As shown in Figs. 17 and 18, tape base 100′ is in position in the channel, the bearing portion being sufficiently wide almost to extend from row 440 to row 442 of the sprocket holes. As will be described below, this arrangement permits excess coating material to run through the sprocket holes into the side drainage troughs. Since the troughs, like the top of the bottom support, are arched or convex longitudinally, the coating material flows away by gravity, and remains out of contact with the tape base. Thus, any of the coating material that passes into the holes is drained therethrough and separately removed to prevent spreading of the coating material laterally beyond the sprocket holes on both sides of the tape base.

Feed hopper 370 (Fig. 12) is secured to the free end of a lateral arm support 450 pivotally supported at the other on a ball-bearing 452 in the upper end of a vertical support 454 attached to platform 414, so that the feed hopper can be raised or lowered, as desired, with respect to the bottom support.

To regulate the vertical height of the space between the feed hopper and the bottom support and to regulate the hopper horizontally with respect to the bottom support, several special features are employed. Thus, the hopper and the bottom support are flanked by a fixed back block 456 (Fig. 11) secured to platform 414 and a slidable front block 458 resting on the platform. The front block is provided with a threaded lateral adjusting rod 460 extending through a vertical arm 462 at the free end of the platform. Lock nuts 464 and 466 on the rod permit lateral adjustment of the rod and hence of the front block.

Secured to opposite sides of lateral arm support 450 (Fig. 11) adjacent the hopper are lugs 468 and 470. The former lug (Fig. 14) is fitted with a vertical adjusting pin 472 having lock nuts 474 and 476 and a turning knob 478; all of which are adjustable with respect to fixed back block 456. The latter lug (Fig. 13) is fitted with a similar vertical adjusting pin 480 having lock nuts 482 and 484 and a turning knob 486, all of which are adjustable with respect to slidable front block 458, the lower end of the pin fitting into a V-shaped notch 488 in the top of the block.

While the feed hopper may be raised and lowered by lifting, since lateral arm support 450 is pivoted, fine adjustment of the hopper with respect to the bottom support is obtained with the adjusting means just described. Vertical pins 472 and 480 are used to adjust the hopper vertically, and lateral rod 460 is used to to adjust the hopper horizontally. In this manner the height of the gap or space between the hopper and the bottom support and the horizontal position of the hopper with respect to the bottom support may be accurately adjusted and then be locked to maintain their relative positions.

Now to examine the feed hopper itself in more detail. As shown more particularly in Figs. 16, 17 and 18, in cross-section the hopper is semi-elliptical in shape, the elliptical front portion 490 facing the approaching tape base while the straight back portion 492 faces the receding coated tape base. The elliptical portion is divided into an intermediate curved part 494 and two straight end parts 496 and 498, the former spanning the width of the tape base, between the two rows of sprocket holes, to be coated, and the latter ending just short of the two rows of sprocket holes to avoid coating of the areas between and immediately adjacent to the holes.

The cross-sectional feed hopper portions just described flare outwardly to form the upper or main body portion 500 of the hopper. As shown in Fig. 11, one end of a tube 502 connects the upper portion of the hopper, while the other end is bent over an over-flow container 504, resting on the top of the drying chamber, to catch excess coating material.

A supply vessel 506 with a removable cover 508 (Fig. 11) is supported in a saddle 510 on an upper platform 512 extending laterally from the top of vertical support 420. A conduit 514, with a valve 516, depends from the vessel into the feed hopper. A supply of finely divided magnetic coating material 520, such as a dispersion of magnetic oxide of iron, is maintained in the vessel. When valve 516 is opened the feed-hopper is filled to a level 522. Since it is well nigh impossible to regulate the valve to pass the precise amount of magnetic material required to coat the tape base, a slight excess is permitted to drop. It finds its way through tube 502 into container 504 and may be returned to the system, preferably after being dispersed specially in a fresh body of coating material to be supplied to vessel 506.

As already indicated, the space between feed hopper 370 and bottom support 372 is accurately adjusted to permit the deposition of a coating of magnetic material of desired thickness on the tape base; after which the cleaned and preliminarily dried tape base 100′ moves upwardly under advance roller 366 (Fig. 12), slides over the top of the bottom support, under the feed hopper, and is given a continuous coating 524 of the magnetic material. The freshly coated tape base 100″ then passes around rollers 374 and 376 to, under and around second sprocket 292 (Figs. 2, 5 and 9) on the far end of drive shaft 284. The coated tape base then passes back and forth in the drying chamber, progressively working its way, while being dried, toward the exit portion of the drying chamber; the lower right corner as one views Fig. 2. During this period of travel the tape base is propelled in its path of travel by the ten driven sprockets and is ready to issue from the chamber as dried coated tape base 100'''.

During its progress back and forth in the drying machines, the tape base, it will be recalled, first passed over the top of the far end drive sprocket 290 on the far end of right cross drive shaft 284 at the back right-hand corner portion of the preliminary drying machine (Figs. 2, 4, 5 and 9), to and through the coating machine and around its five rollers 362, 364, 366, 374 and 376 (Figs. 11 and 12), and back to, under and around the top of second far drive sprocket 292 on the cross drive shaft. From thence the tape base moves to the left to and around the top of first roller 340 on the far end of left cross-shaft 330; then to the right back to, under and around the top of third drive sprocket 294 on the right cross-shaft. By this time, the pattern of the back-and-forth movement of the coated tape base is well established. It is one in which the uncoated side only of the tape base comes in contact with the sprockets and rollers, thus permitting the coating to dry and not to be injured by physical contact with any moving or fixed parts of the drying machine.

It is clear from the alternate arrangement of sprockets and rollers on the right cross-drive shaft and the complementary off-set rollers on the left cross-shaft, that the coated tape continues to advance back and forth in the same general movement pattern. From drive sprocket 294 the tape base returns to the next roller 340 in the series on the left cross-shaft, back to roller 310; thence another roller 340, roller 312, third roller 340, sprocket 296, fourth roller 340, roller 314, etc., until, as stated below, the tape base is dried and reaches the last near end sprocket 308, on the right cross-drive shaft, at the right front side portion of the drying machine.

The back-and-forth movement of the coated tape base as it advances across the drying chamber may be regarded as a general helical movement. This is assured by the form of structure employed. Thus, right cross-drive shaft 284 and left cross-shaft 330 may be considered, in cross-section as side members of a generally rectangular frame. The manner in which the sprockets and rollers of shaft 264 are successively off-set with respect to the rollers of shaft 330 assures a generally helical guide support and hence a helical course of travel, for the coated tape base, as it advances progressively across the drying-chamber. The helical course may be made as long as desired and the coating is kept continuously out of contact with the frame, including sprockets and rollers.

Other forms of structure may be used to provide the helical guide support for the advancing coated tape base. For example, in cross-section the support may be polygonal, circular, elliptical, etc. While the position of the support in the instant case is fixed, the support as a whole may be rotated, say by a central shaft or other driving means. What is important is that the path of travel of the coated tape base shall be generally helical.

The detention period of the tape base in the drying chamber must be long enough to assure adequate drying of the coating. It is dependent upon the suitable regulation of a number of variables, such as the temperature and rate of progress of the heated air through the chamber; the length, width and height of the chamber; the number and spacing of the sprockets and rollers; the rate of travel of the tape base through the chamber; the viscosity and composition of the coating material; the thickness of the coating, etc. A few trial and error tests easily indicate suitable operating conditions.

Since the tape base passes back and forth in a zig-zag manner (Figs. 2 and 3), it is given a slight twist, particularly at the sprockets and rollers on the cross-shafts, to direct the moving tape base on a bias toward the next sprocket or roller in the path of travel, thus advancing the tape base gradually from the back side to the front side of the drying chamber. With a drying chamber of suitable length the amount of twist is insufficient permanently to distort the tape base. This is particularly true of the moving picture type of magnetic sound recording tape base because it is quite narrow in width. The wider the tape base, the greater, of course, is the amount of twist for a drying machine of given size; and, by the same token, the longer the drying chamber the less is the twist. Here again one must be practical in selecting a chamber of adequate length.

*Winding device*

While a plan view of the winding device is found in Fig. 2, it is detailed in Figs. 19–23. Drive shaft 284, it will be recalled, extends transversely of the right end of the heating chamber. The last or tenth drive sprocket 308, on the near end of the shaft, helps to propel the dried coated tape base through slot 530 in right end wall 218 of the heating chamber. Since the coated tape base passes around its lower portion, the sprocket rotates clockwise as one views Figs. 19 and 21.

Intermediate the slot and slightly above the sprocket is inside roller 532 mounted on the upper end of a depending bracket 534. The bracket is pivotally secured intermediate its ends to a lateral fulcrum 536 secured to the end wall. The lower end of the bracket is pivotally connected to a lateral pull rod 538 extending through the wall a convenient distance. It is provided at its free end with a hand knob 540; compression spring 542 is attached at one end to the hand grip and at the other end to a collar 544 secured to the end wall. The spring functions normally to keep the flanges of roller 532 in frictional engagement with the flanges of drive sprocket 308, thus causing the roller to rotate in a counter-clockwise direction, again as one views Figs. 19 and 21.

A curved guide plate 550, of sheet metal, is spaced between the flanges of and a short distance above the roller to provide a passageway for the tape base. The guide plate is secured at its upper end to the end wall of the drying chamber. The lower end of the guide plate curves downwardly toward the roller surface portion of the drive sprocket, intermediate its flanges, but above the normal path of travel of the coated tape base. As shown in Fig. 21 particularly, the tape base normally is not in contact with the guide plate. The guide plate, however, is useful in threading the forward end of the tape base when beginning operations. It also helps to keep the forward end of the tape base from springing back into the drying chamber, more especially when a spliced portion (to be described below) is cut therefrom as it issues from the chamber. The plate also keeps the adjacent coated tape base from twisting and wrinkling.

Spring 542 normally is under sufficient compression to keep the flanges of the roller in tight engagement with the flanges of the drive sprocket. This assures continuous rotation of the roller which helps to propel the tape base forwardly. Such engagement of the flanges, however, may be broken, when desired, by pushing on hand knob 540.

Closely associated with inside roller 532 is an outside roller 552, adjacent slot 530, mounted in journals 554 attached to the outside of right end wall 218. It helps to guide the dried tape base into the winding zone for rolling onto reels and also to divert temporarily, when desired, unrolled tape base into a container 560 directly below the roller; particularly when a spliced section of the tape base is to be removed, as will be described in some detail below.

A rearwardly extending front side arm 562 (Figs. 2, 19 and 20) is secured to front side wall 224 of the drying chamber. A journal 564, fitted with a shaft 566, is attached to the top of the arm a convenient distance from the drying chamber. A pulley 568 is integrally secured to the near end of the shaft. As in the case of shafts 66 and 68 (Figs. 2, 4 and 8), the other end of shaft 566 is fitted with a fixed half-reel 570 provided with tapered end 572 adapted to fit into hub 574, like hubs 92 and 94, of standard design. The hubs used with the winding and unwinding devices are interchangeable, being adapted to fit on any of the half-reels.

As shown to better advantage in Fig. 20, transverse drive shaft 284 in the right end of the drying chamber terminates exteriorly in a drive pulley 580, a belt 582 fits over that pulley as well as pulley 568 on shaft 566. Rotation of the drive shaft therefore rotates the latter pulley; thus rotating half-reel 570. The end of dried tape base 100''' issuing through slot 530 in the right end of the drying chamber is secured to hub 574, and is rolled thereon.

A braking or tensioning device 586 (Figs. 19, 20 and 23) is associated with the lower mid-portion of the drive belt in order to slow down the hub as its roll of tape base increases in diameter. Unlike the automatic tension braking device associated with the unwinding device (Figs. 2, 4 and 5), the present one is hand-operated. As shown in Fig. 23, it includes a fixed lateral block 588, secured to the top of extension arm 562, through which depends a movable vertical block 590; and into the lower end of which fits a lateral stub shaft 592 having a brake pulley 594 mounted thereon. Extending through a threaded hole in the fixed lateral block is a vertical threaded rod 596, to the upper end of which is fixed a hand wheel 598 having an annular flange 600 fitting into a complementary groove in the adjacent side of the depending movable vertical block. The hand wheel can be turned to move the vertical block, and hence the brake pulley, up or down, as required to decrease or increase its braking action on belt 582. As the roll of tape base on the half-reel builds up, the hand wheel is turned from time to time to increase the brake action on the reel and hence to keep under control the tendency of the reel unduly to increase its momentum.

To facilitate operations, an empty hub 604 (Fig. 19) is kept close at hand. In the instant construction it is temporarily mounted on tapered end 608 of a half-reel, 606, suitably supported on rearwardly extending front side arm 562. When hub 574 and its roll of tape base are removed from half-reel 570, empty hub 604 is quickly removed from its tapered shaft end 608 of half-reel 606 and mounted on tapered end 372 of half-reel 570. The forward end of the tape base issuing from the drying chamber is attached to the empty hub, and winding of a new roll proceeds as before.

*Splicing device*

Returning to Figs. 2, 4 and 5, splicing zone G is shown directly above half-reel 80 in unwinding zone A, adjacent the cleaning device. An enlarged detail of splicing device 52 is given in Fig. 24. The splicing device includes a vertically extending L-shaped support 610 attached at its lower end to rearwardly extending back side arm 60. A splicing platform 612 is pivotally secured to the upper end of the L-support. It is adapted to swing (Fig. 4) into a forward working position and into (see dotted outline, Fig. 24) a rearward position when not in use. The platform is in the shape of a channel 614, with side flanges 616 and 618, and a pair of spaced sprocket-hole teeth 620 and 622. The width of the channel is such as to accommodate easily, not tightly or too loosely, the width of the pieces of tape base to be spliced. The spacing and size of the teeth are such as to fit easily into two superposed pairs of opposed sprocket holes in the pieces of tape base to be spliced. The channel itself helps to align the sprocket holes of the pieces of tape base being spliced. If the tape base is not of the moving picture film type, the sprocket teeth in the platform are omitted. The channel itself is then adequate to align the tape base ends for splicing.

For the splicing operation itself, reference may be made to Figs. 25–31, in addition to Fig. 4. As shown in dotted outline in the latter figure, tail or rearward end 630 of tape base 100, at the end of its roll, previously on hub 92 on half-reel 80, is to be spliced to forward end 632 of tape base 102, on the roll on hub 94 on half-reel 82, about to be unwound for processing.

A previously prepared (Fig. 25) laminated splicing band 634 is employed. It includes an inside adhesive band 636, with adhesive surfaces on both sides, protected temporarily by a lower removable cover 638 and an upper removable cover 640.

As shown in Fig. 26, forward end 632 of tape base 102 is placed in channel 614 of splicing platform 612, in its horizontal or working position, being locked therein temporarily by sprocket teeth 620 and 622. Lower cover 638 is removed from adhesive band 636 and the band is placed on the top of forward end 632 of the tape base, intermediate its two rows 642 and 644 of sprocket holes.

The combined forward tips 646 (Fig. 26) of the tape base, adhesive band 636 and upper cover 640 are then sharply cut off, say with shears, along the left end edge of the splicing platform, as shown to the left of Fig. 26. This assures (Fig. 27) a tight adhesive contact between the forward end of the tape base and the adhesive band; which is highly desirable in stringing or feeding forward end 632 of tape base 102 through the cleaning device, the preliminary drying, the coating and the final drying machines. Since there is no loose end of the spliced assembly to catch against a guide, sprocket, roller or other part of the apparatus, the spliced portion glides smoothly over all parts it engages physically. Upper cover 640 is stripped off the top of adhesive band 636. The preliminary splicing operation with tape base 102, just described, takes place before tape base 100 is completely unrolled from its hub, because the operator has not got much time for, and, consequently, must move quickly during, the next splicing operation while tape base 100 continues to be processed without any interruption.

The operator watches closely the final unwinding of tape base 100 from its hub on half-reel 80 because he does not want to lose control of its tail or rearward end 630. If the free tail end of the tape base should advance through the cleaning device into the drying machine, he would have to string or feed manually forward end 632 of tape base 102 through the apparatus. He avoids this laborious and time consuming job by grasping the unwound tape base near the roll when only a few more turns, which are wrinkled, undesired, and discarded, remain on the roll, cutting the tape base while holding the resulting free tail or rearward end of tape base 100 as it leaves its hub, raises and pulls it over the top of the splicing platform, with its sprocket holes engaging the sprocket teeth of the splicing platform, places and presses the tail end of the tape abse on the top of adhesive band 634 and the forward end of tape base 102, as shown in Figs. 28 and 29. The free extreme rearward end of tape base 100 is permitted to extend beyond the adhesive band, as shown to the right of Figs. 30 and 31 (after coating), because it does not materially interfere with the smooth progress of spliced portion 650 through the remainder of the apparatus.

When tail end 630 of tape base 100 is grasped, raised, pulled and placed over the splicing platform (Fig. 4), bottom rollers 126 and 128 and their side supports 130 and 132 are raised upwardly in tank 100 of cleaning device 42, toward the position 138' shown in dotted outline. The raising of the bottom rollers is due to the pulling action of tape base 100 as a whole as it is advanced forwardly through the apparatus by the driving means and in part to the rearwardly pulling action of the operator as he raises and places the tail end of the tape base onto the splicing platform.

In any event (Fig. 4), as the bottom rollers and the tape base loops rise in the body of cleaning liquid, accumulated slack in the loops is taken up and the operator is given time in which to complete the splicing operation. The loops attain a predetermined maximum length to provide the desired amount of slack.

While the loops and hence the slack may be made long enough to permit enough time to complete the entire splicing operation at this stage, we prefer to proceed in two stages in the manner described.

The slack-producing zone need not be in the cleaning zone, but the present arrangement has the advantage that they complement each other, in addition to saving space. As noted above, the formation of the loops aids the cleaning of the tape base and the cleaning aids the forming of the desired slack in the loops.

When splice 650 is completed, the operator removes empty hub 92 from half-reel 80, raises the spliced ends of tape base 100 and tape base 102, frees them of the splicing platform, permits the resulting slack of tape base to go into the cleaning device, and moves full hub 94 and its roll of tape base 102 from half-reel 82 onto half-reel 80.

Since the cleaning liquid may impair the bond between the adhesive band and the tape base ends attached thereto, for example, by dissolving or softening the adhesive, it is advantageous not to bring the splice in contact with the liquid. To this end the operator permits the loops of slack tape base to rise above liquid level 142 (see dotted outline 138' of bottom rollers 126 and 128, Fig. 4), and then permits the splice to pass completely around the lower rollers on its way to the air squeegees. He can do this by controlling the rate at which the splice is fed to and through the slack-producing zone, so that the cleaning liquid is entirely by-passed. While the section of the tape base thus by-passed is not cleaned, the amount is negligible and, in any event, usually is not used.

Due to the weight of bottom rollers 126 and 128 (Fig. 4), they sink by gravity to the bottom of the body of cleaning liquid in tank 100, exerting an increased pull on the new roll of tape base and its hub and thereby increasing temporarily the speed of rotation of half-reel 80 against the brake-action of brake discs 70 and 72, as well as restoring the loops of tape base to their former length and hence providing the required slack for the next splicing operation. In a few moments tape base 102 unwinds at the same rate the remainder of tape base 100 advances through the coating and drying machines. As this occurs the forward end of tape base 102 is pulled, strung or fed automatically and continuously through the cleaning device, the preliminary drying machine, the coating and final drying machines to the winding device, without any loss of time.

Such continuity of movement of tape base through the apparatus as a whole is of vital importance. It assures efficient, rapid, production of coated tape base. If the continuity is broken, for example, by stopping the motor, difficulties promptly arise in the coating zone. The coating material continues to flow from the feed hopper; spreading itself all over the immediate stationary tape base; the bottom support and adjacent portions of the coating machine; etc. Time and labor are required to clean the resulting mess; the coating on that portion of the tape base is rendered useless; tape base must be passed through the coating machine until normal coating conditions are re-established; a substantial amount of the tape base is rendered useless; it must be located and cut out later; the new ends must be spliced; the over-all linear length of the properly coated tape base must be determined; etc. All in all, the breaking of the continuity of passage of tape base through the apparatus is vexatious and costly. Fortunately, the present improvements permit operations to be continuous and such difficulties are avoided.

Since the slack loop or loops of tape base help to establish that continuity, a suitable linear length must be selected. That length depends on the speed of travel of the tape base through the apparatus and the time required by the operator to splice the tail end of the unwound roll to the forward end of the next roll of tape base. As a safety factor, excess slack is provided, so that the operator may be certain to complete the splicing operation.

The spliced portion between the two rolls, moreover, is in such condition that it passes easily through the coating zone. Due to the adjustability of the bottom support and the feed hopper with respect to each other, the spliced portion passes between them without any difficulty, the feed hopper rising automatically to permit the splice to pass thereunder.

A fresh roll of tape base is mounted on half-reel 82 in readiness for the same type of procedure. Its forward end is brought over the top of the splicing platform and secured to another adhesive band, all in readiness for splicing to the tail or rearward end of tape base 102 when it leaves hub 94.

The operator may soon divert his attention to winding device 50. He can tell by observing the size of the roll of coated tape base 100''' on half-reel 570 when it is about time to expect spliced portion 650 of tape bases 100 and 102 to issue from the drying chamber. To this end he also looks through the top windows of the drying chamber of the final drying machine to note and trace the progress of the spliced portion toward the discharge end of the drying chamber. For purposes of discussion it may be assumed that tape base 102 is being processed at this stage, although the drawings illustrate this with respect to tape base 100.

He turns (Fig. 19) hand-wheel 598 on braking device 586 to adjust the braking or slippage action of belt 582 and stands in readiness with a pair of shears. When the spliced portion issues through slot 530 in the discharge end of the final drying chamber he quickly cuts away and discards the entire spliced portion (Figs. 30 and 31). He drops the forward portion of tape base 102 into container 560, where the oncoming dried, coated tape base continues to collect while he removes wound roll of tape base 100''' and its hub 574 from half-reel 570; and while he removes empty hub 604 from its half-reel 606 and mounts it on half-reel 570. He lifts the forward end of dried, coated tape base 102''' from container 560, attaches it to empty hub 604 for winding into a new roll, as before. Due to the decrease in braking action, slack tape base 102''' in the container is wound rapidly onto the hub, after which the operator may again turn, as he continues to do from time to time, hand-wheel 598 to regulate the rate of winding of the roll in accordance with the rate of issue of coated tape base from the drying chamber. Another empty hub is mounted on half-reel 606 in readiness for another such procedure when tape base 102''' is wound into its roll.

Except for the small pieces of tape base in the discarded spliced portions, each roll of coated tape base is as long as it was when uncoated. That is, each roll of fresh or uncoated tape base is processed into its own roll of coated tape base. The spliced portion between rolls is only a temporary expedient, used automatically to cause tape base in a succeeding roll to follow the same path of travel taken by tape base from a preceding roll.

It will thus be seen that the methods of the present application provides a number of novel and highly useful improvements. To those skilled in this art, it will be clear also that the above description is only by way of illustrating a practice of the invention, and that a number of useful modifications likewise may be employed in such practice.

We claim:

1. In a method of producing blank magnetic sound recording tape wherein an elongated piece of tape base of the moving picture film type having at least one longitudinal row of sprocket holes is unwound from a roll of the same in a winding zone, passed while under tension through a magnetic coating zone and a drying zone and wound into a roll in a winding zone; the improvement which comprises unwinding the tape base from the roll in an unwinding zone separated and removed from the magnetic coating zone to make possible a fixed path of travel for the unwound tape base as it goes through the magnetic coating zone, passing the tape base while still under tension from the unwinding zone, in a fixed path of travel, through a gap of predetermined transverse height beneath a superposed source of a fluid magnetic coating material and, as the tape base passes beneath said source of coating material, depositing on the top surface of an intermediate transverse portion of the tape base and inwardly of the row of sprocket holes a coating of the magnetic material, said fixed path of travel carrying the tape base a fixed distance below the source of the coating material, whereby the layer of coating material applied to the tape base is of predetermined uniform width and thickness, and separately removing any of the magnetic coating material draining through said sprocket holes to prevent spreading of the coating material laterally beyond the holes of the tape base.

2. A method according to claim 1 in which the tape base is of the motion picture type having a longitudinal row of sprocket holes along each side thereof, the magnetic coating material is applied inwardly of each row of holes, and the magnetic coating material draining through the sprocket holes at each side of the tape base is separately removed so that spreading of coating material laterally beyond the holes at each side of the tape base is prevented.

3. A method according to claim 1 in which the tape base, while passing through the coating zone is arched and flexed lengthwise of the path of travel to straighten out and to prevent the formation of wrinkles in the tape base so that the surface to be coated is conditioned for the deposition thereon of a smooth uniform layer of magnetic material.

References Cited in the file of this patent

UNITED STATES PATENTS

| | | |
|---|---|---|
| 101,732 | Heist | Apr. 12, 1870 |
| 1,281,728 | Weinheim | Oct. 15, 1918 |
| 1,616,642 | Troland et al. | Feb. 8, 1927 |
| 1,653,467 | O'Neill | Dec. 20, 1927 |
| 1,667,408 | Allen | Apr. 24, 1928 |
| 1,764,423 | Stone | June 17, 1930 |
| 2,022,322 | Pelton | Nov. 26, 1935 |
| 2,541,136 | Warren | Feb. 13, 1951 |